June 30, 1964  MITSUJI HIROUMI  3,139,053
METHODS OF AND APPARATUS FOR MANUFACTURING DRUMS OF TIN CANS
Filed Dec. 14, 1959  4 Sheets-Sheet 1
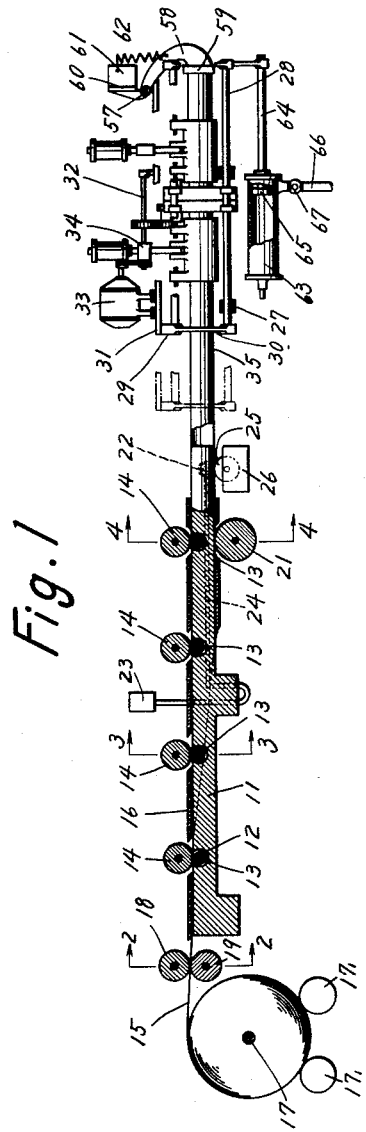
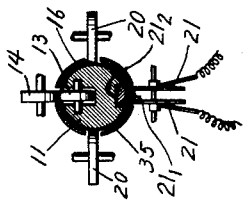
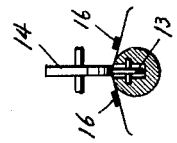
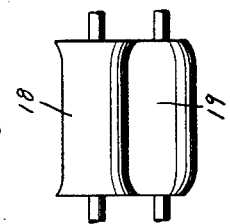
MITSUJI HIROUMI
INVENTOR
ATTORNEYS

MITSUJI HIROUMI
INVENTOR

ATTORNEYS

June 30, 1964  MITSUJI HIROUMI  3,139,053

METHODS OF AND APPARATUS FOR MANUFACTURING DRUMS OF TIN CANS

Filed Dec. 14, 1959  4 Sheets-Sheet 4

MITSUJI HIROUMI
INVENTOR

By Wenderoth, Lind & Ponack
ATTORNEYS

United States Patent Office 3,139,053
Patented June 30, 1964

1

3,139,053
METHODS OF AND APPARATUS FOR MANUFACTURING DRUMS OF TIN CANS
Mitsuji Hiroumi, No. 7, 4-Chome, Ohiraki-cho,
Fukushima-ku, Osaka, Japan
Filed Dec. 14, 1959, Ser. No. 859,198
Claims priority, application Japan Oct. 17, 1959
2 Claims. (Cl. 113—33)

This invention relates to methods of and apparatus for manufacturing drums of tin cans.

A known type of manufacturing process for forming a drum for a tin can, in which a tin plate is first cut in a rectangle and then rolled into a cylindrical form with both abutting edges bent inward, soldered and hemmed, not only is the efficiency very low and unfit for mass production, but also the products are not clean because solder gets into the drums, and the feeding speed is comparatively small because the process must be carried out with intermittent motion.

The object of the present invention is to provide a method and an apparatus for automatically and continuously making drums for tin cans.

With this object in view, the present invention provides a method and an apparatus for automatically and continuously manufacturing of drums for tin cans, in which a tin strip is gradually formed into a pipe as it is fed along the machine, with the abutting edges joined by electric welding, and the tin pipe is then cut into certain prescribed lengths by an automatic cutting device, and they are cut into individual drums by an individual cutting device.

According to the present invention, the efficiency of manufacturing tin drums is very high and the mass production of them is far easier.

Other and the further objects of the present invention will become apparent from the following specification and claims taken together with the accompanying drawings in which is shown the preferred embodiment of the method and the apparatus for manufacturing drums for tin cans according to the present invention.

FIG. 1 is a plan view partly in section of an apparatus for manufacturing drums for tin cans according to the present invention.

FIG. 2 is a sectional side view taken on the line 2—2 of FIG. 1.

FIG. 3 is a sectional side view taken on the line 3—3 of FIG. 1.

FIG. 4 is a sectional side view taken on the line 4—4 of FIG. 1.

Figure 5:
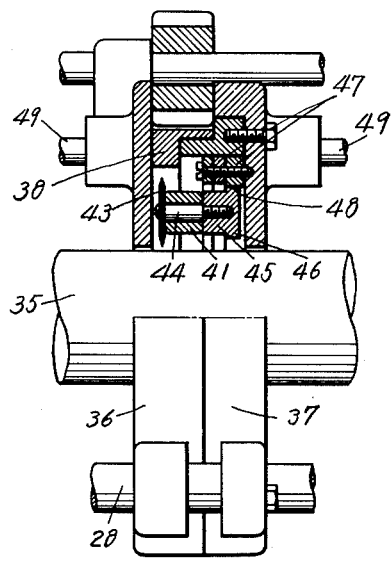
FIG. 5 is an enlarged elevation view partly in section of a cutter part of the apparatus for manufacturing drums for tin cans according to the present invention.
Figure 6:
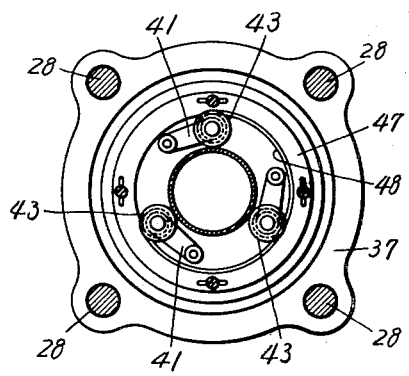
FIG. 6 is a left side view of FIG. 5 with a left casing removed.
Figure 7:
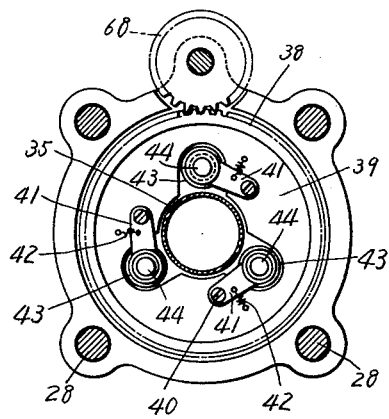
FIG. 7 is a right side view of FIG. 5 with a right casing removed.
Figure 8:
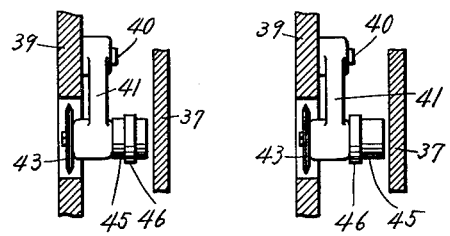
FIG. 8 is an elevation of a cutter part partly in section.

In these drawings reference numeral 11 indicates a core which is round in section and mounted horizontally, on the upper surface of which are formed a number of recesses 12 at certain intervals, each provided with a freely rotatable roller 13, the top of which is level with the surface of the core 11. Opposed to each roller 13 is mounted a feed roller 14 which is revolved by some proper interlocking device to move forward a tin strip 15, pressing it on the roller 13. An external mold 16, installed on the core 11 with a gap between it and the core for the tin strip 15 to pass through has one end even with the end of the core 11, and gradually increases in breadth and is bent downwardly around core 11 to cover by degrees the surface of the core 11, and at the other end it is perfectly transformed into a tube enveloping the core. Between the core 11 and a spindle 17 mounted on a pair of supporting rollers $17_1$ are placed a pair of feed rollers 18, 19 which also serve as a bender. The tin strip 15 rolled on the spindle 17 is fed by these rollers 18, 19 with both edges bent downward in an arc-shape, as shown in FIG. 2. Then it is fed through the circular gap between the core 11 and the external mold 16, the tin strip 15 is gradually rolled into a cylindrical form as shown in FIGS. 3, 4 and at the terminal part of the core 11 is formed into tin pipe by the agency of lateral feed rollers 20, 20 shown in FIG. 4, and the abutting edges are welded by rollers 21 having electric terminals. In the electric welding portion, supporting pieces $21_1$ and $21_2$ of insulating and hard material such as ceramic are fitted in the external mold 16 and the core 11 opposite to each other so as to conform the abutting edges of the thin tin tube to each other. And then some hygienic stainless paint is applied to the seam at the farthest end of the core 11. As shown in FIG. 1, a feed roller 22 is constantly fed with a constant quantity of paint from a paint tank 23 by way of a paint conduit 24 laid through the core 11. Under the core 11 is mounted another roller 25 in a paint tank 26 in order to apply the same paint to the outside of the welded seam, and thus the tin strip 15 is transformed into a tin pipe 35 and moves on to the cutting device without interruption.

On a fixed frame 27 are installed four slidable rods 28, at the front and rear portions of which are fixed side plates 29, 29, forming a slidable frame 30. On a bed 31 attached to the slidable frame 30 is mounted a driving shaft 32 driven by a motor 33 with an electromagnetic switch 34 between them. At the proper position on a slidable frame 30 are fixed casings 36, 37 separably jointed to each other, encircling the tip pipe 35, and inside the left casing 36 is set a hollow gear 38, on the disc part 39 of which are fixed three pins 40 equidistantly spaced around the center of the disc part 39, each having a cutter arm 41 rotatably mounted on it. A spring 42 pulls the cutter arm 41, the outer end of which arm is provided with a disc cutter 43 capable of free rotation.

Figure 9:
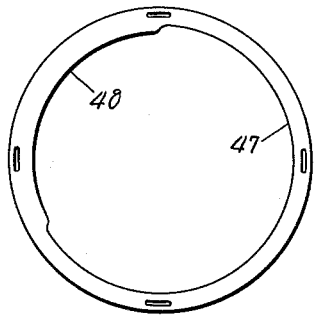
FIG. 9 is a side view of a cam for cutters.

On the rear portion of a shaft 44 of each disc cutter 43 is mounted a roller 45, on which a collar 46 is formed in a position different from the positions of corresponding collars on the other two rollers 45. These three collars 46 are brought in contact with a plurality of ring cams 47 (FIGS. 5 and 9) fixed inside the right casing 37, one third of the inner surface of each ring cam being a projecting part 48 in a position offset 120° from corresponding projections on the other two.

On the middle of the upper part of each casing 36, 37 is fixed a pin 49 parallel with the axis of the tin pipe 35, each provided with a grip 50, with arms 51, 51 hinging on the pin 49. On the outside of semi-circular rings 52, 52 of each grip 50 are formed projections $52_1$, $52_1$, which are so connected with a movable rod 54 of an electro-magnet 53 by connecting rods 55, 55 that the semi-circular rings 52, 52 may open when the rod 54 ascends and shut when it descends. On the inside of each semi-circular ring 52 are radially arranged a number of electromagnets 56, the two semi-circular rings of iron cores encircling the tin pipe 35 in a complete ring when the semi-circular rings 52, 52 are shut.

On a pin 57 at the fore end of the bed 31 hinges an oscillating piece 58, provided on its lower end with a stopper 59 to meet the on-coming end of the tin pipe 35 and on its upper end an iron core 60 to be drawn by an electromagnet 61. When the electromagnet 61 is not excited, the oscillating piece 58 is pulled up by a spring 62. Between the fixed frames 27, 27 is installed an air cylinder 63 with a piston rod 64 extending from piston 65 and being firmly fixed to the slidable frame 30. At the fore end of the air cylinder 63 is fixed an air pipe 66 provided with a three way cock 67. The gear 38 co-operates with the driving shaft 32 by means of an intermediate gear 68, and switches for operating the electromagnetic switch 34 and the electromagnets 53, 56, 61 in a prescribed order are placed in a proper arrangement.

Figure 10:
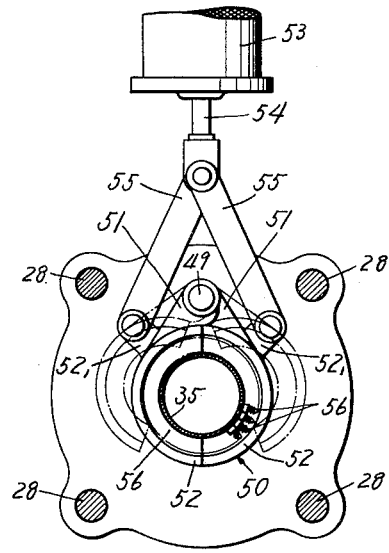
FIG. 10 is a side view of a tin pipe gripping part of the apparatus for manufacturing drums for tin cans according to the present invention.

When the slidable frame 30 is in its leftmost position shown in FIG. 1, the movable rod 54 of the electromagnet 53 is pulled up by a spring (not shown), the grip 50 is open as shown with the chain line in FIG. 10, the electromagnets 56, 56 are not excited, and with the electromagnetic switch 34 off, the driving shaft 32 does not revolve in spite of the motor 33 running, while the forefront of the air cylinder communicates with the open air through the three way cock 67, and only the electromagnet 61 is excited and the stopper 59 is in its lower position.

When the tin pipe 35 moves along the core 11 and its end comes in contact with the stopper 59, a limit switch (not shown) is actuated, and the electromagnets 53, 53 are excited to close the grips 50, 50. When the grip 50, 50 is perfectly closed, a limit switch (not shown) works and the electromagnets 56, 56 inside the grip 50, 50 are excited and attract the tin pipe 35, preventing its dodging a cut by the disc cutters 43.

Then a limit switch (not shown) for the electromagnetic switch 34 works and the motor 33 and the driving shaft 32 are connected, turning the gear 38 in the casing 36. At this, each cutter arm 41 turns with the gear 38, and the collar 46 formed on the roller 45 mounted on the rear portion of the shaft 44 of the cutter 43 runs on the projection 48 of the ring cam 47 so that each cutter arm 41 turns on the shaft 44 towards the tin pipe 35 and presses the disc cutter 43 against it. Thus as each cutter arm 41 turns through 120° and the gear 38 turns one revolution, the tin pipe 35 is cut into a certain prescribed length, and when the gear 38 has finished one revolution, a limit switch (not shown) works and with the electromagnets 53, 56, 61 all off the cut tin pipe drops down. Then the position of the three way cock 67 changes, the front part of the air cylinder 63 is supplied with compressed air and the piston 65 is thrust to the left, bringing the slidable frame 30 back to the former position by means of the piston rod 64, with all the parts of the cutting device also returned to the former positions. Then, the cut tin pipes are cut into individual drums by an individual cutting device.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

Having thus described my invention, what I claim and desire to secure by Letters Patent of the United States is:

1. An apparatus for making cylindrical tubular sections for tin cans, comprising a core having a round cross section, a plurality of idler rollers in said core with the peripheries thereof level with the surface of the core and being positioned along a line on the core, a guide along said core and gradually bending around said core until it is concentric therewith for bending a sheet of metal around the core, a plurality of driven feed rollers along the core and extending through said guide and being opposed to said idler rollers for feeding a sheet of metal along the core, a pair of welding rollers adjacent said core along the portion where said guide comes together around the core for welding a sheet of metal bent into a cylinder, a pair of opposed coating rollers, one within the core and the other outside the core and on a line with the welding rollers for coating a welded seam, and a cutting device beyond the end of the core consisting essentially of a cylinder-piston means extending parallel to the core, a three-way valve on one end of said piston-cylinder means, a compressed air supply coupled to said three-way valve, said three-way valve having an outlet to the atmosphere and an outlet to the interior of said piston-cylinder means for driving said piston in the opposite direction to the direction of movement of said sheet metal cylinder when compressed air is admitted to the piston-cylinder means and venting said piston-cylinder means to the atmosphere when the piston thereof moves in the same direction as the sheet metal cylinder, a frame mounted on said piston, a pair of grips on said frame for gripping and moving the cylinder of sheet material as it comes off the end of the core, an annular casing on said frame between said grips and having the central space therethrough aligned with said core, an annular disc rotatably mounted in said casing and having a plurality of cutters thereon equidistantly spaced around said disc, cam means in said casing acting on said cutters for moving said cutters toward the central opening of said disc, and driving means on said frame drivingly connected to said disc for rotating said disc.

2. An apparatus as claimed in claim 1 in which said grips each comprise a pair of semi-circular members each having a plurality of electromagnets around the interior thereof, and magnet energizing means connected to said magnets.

References Cited in the file of this patent
UNITED STATES PATENTS

| | | |
|---|---|---|
| 1,184,947 | Gossett et al. | May 30, 1916 |
| 2,177,104 | Gonser | Oct. 24, 1939 |
| 2,317,919 | Krueger | Apr. 27, 1943 |
| 2,323,329 | Hothersall | July 6, 1943 |
| 2,444,463 | Nordquist | July 6, 1948 |
| 2,822,291 | Hahn | Feb. 4, 1958 |
| 2,927,371 | Hays | Mar. 8, 1960 |